United States Patent
Huang (10) Patent No.: US 11,340,859 B2
(45) Date of Patent: May 24, 2022

(54) SYNCHRONOUS DISPLAY METHOD, STORAGE MEDIUM AND ELECTRONIC DEVICE

(71) Applicant: NETEASE (HANGZHOU) NETWORK CO., LTD., Zhejiang (CN)

(72) Inventor: Xinyu Huang, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/042,938

(22) PCT Filed: Jun. 3, 2019

(86) PCT No.: PCT/CN2019/089770
§ 371 (c)(1),
(2) Date: Sep. 29, 2020

(87) PCT Pub. No.: WO2020/147246
PCT Pub. Date: Jul. 23, 2020

(65) Prior Publication Data
US 2021/0334061 A1    Oct. 28, 2021

(30) Foreign Application Priority Data

Jan. 17, 2019    (CN) .......................... 201910045548.0

(51) Int. Cl.
*G06F 3/14*    (2006.01)
*G06T 3/60*    (2006.01)

(52) U.S. Cl.
CPC .......... *G06F 3/1462* (2013.01); *G06F 3/1423* (2013.01); *G06T 3/60* (2013.01)

(58) Field of Classification Search
None
See application file for complete search history.

(56) References Cited

U.S. PATENT DOCUMENTS 10,445,051 B1 * 10/2019 Subash ................. G06F 3/0482
2001/0047393 A1 * 11/2001 Amer ...................... G06F 9/546
709/216

(Continued)

FOREIGN PATENT DOCUMENTS

| CN | 105988688 A | 10/2016 |
|---|---|---|
| CN | 108347452 A | 7/2018 |
| CN | 109766163 A | 5/2019 |

*Primary Examiner* — Jason A Pringle-Parker
(74) *Attorney, Agent, or Firm* — Gang Yu (57) ABSTRACT

A synchronous display method, a storage medium and an electronic device are provided. The method includes: screenshot information of a first terminal is acquired, and the screenshot information into a bitmap corresponding to the screenshot information is converted; a rotation state of a screen of the first terminal is acquired; and when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap.

20 Claims, 5 Drawing Sheets

(56) References Cited

U.S. PATENT DOCUMENTS

| | | | |
|---|---|---|---|
| 2009/0192702 A1* | 7/2009 | Bourne | G01C 21/3492 |
| | | | 701/532 |
| 2012/0185066 A1 | 7/2012 | Kern et al. | |
| 2016/0188282 A1* | 6/2016 | Tang | G09G 5/12 |
| | | | 345/1.1 |
| 2017/0109123 A1* | 4/2017 | Sugaya | G09G 5/12 |
| 2020/0380901 A1* | 12/2020 | Ryu | G09G 3/20 |
| 2020/0380935 A1* | 12/2020 | Ignaszewski | G06F 1/1622 |

\* cited by examiner

SYNCHRONOUS DISPLAY METHOD, STORAGE MEDIUM AND ELECTRONIC DEVICE

CROSS-REFERENCE TO RELATED APPLICATIONS

The present disclosure claims priority of Chinese Patent Application No. 201910045548.0, filed on Jan. 17, 2018 and named after "Synchronous Display Method and Apparatus, Storage Medium and Electronic Device", Contents of the present disclosure are hereby incorporated by reference in its entirety of the Chinese Patent Application.

TECHNICAL FIELD

The present disclosure relates to the field of computers, and in particular to a synchronous display method, a storage medium and an electronic device.

BACKGROUND

At present, during development and debugging of at least one application of Android phone, it is necessary to access and operate a screen of a remote terminal screen on a Personal Computer (PC) side. Usually, a framework (minicap) of a remote operation Android phone tool (Smartphone Test Farm (STF)) tool based on an open source code base (Github) is used. The minicab can realize real-time display of at least one mobile phone.

Aiming at the above problem in the related art, no effective solution currently exists.

SUMMARY

At least one embodiment of the present disclosure provides a synchronous display method and apparatus, a storage medium, and an electronic device.

According to an embodiment of the present disclosure, a synchronous display method is provided. The method may include that: screenshot information of a first terminal is acquired, and the screenshot information is converted into a bitmap corresponding to the screenshot information; a rotation state of a screen of the first terminal is acquired; when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap; and when it is determined that the screen does not rotate according to the rotation state, the bitmap is converted into the picture byte stream, and the picture byte stream is transmitted to the second terminal to synchronously display the screenshot information corresponding to the bitmap.

According to another aspect of the present disclosure, a synchronous display apparatus is provided. The apparatus may include at least one processors and at least one memory for storing at least one program element, where the program element is executed by the at least one processor. The at least one program element may include: a first acquisition component, configured to acquire screenshot information of a first terminal, and convert the screenshot information into a bitmap corresponding to the screenshot information; a second acquisition component, configured to acquire a rotation state of a screen of the first terminal; and a display component, configured to perform a transposition operation corresponding to the rotation state on the bitmap, convert the bitmap after the transposition operation into a picture byte stream, and transmit the picture byte stream to a second terminal to synchronously display the screenshot information corresponding to the bitmap, when it is determined that the screen rotates according to the rotation state; and convert the bitmap into the picture byte stream, and transmit the picture byte stream to the second terminal to synchronously display the screenshot information corresponding to the bitmap, when it is determined that the screen does not rotate according to the rotation state.

According to another embodiment of the present disclosure, a non-transitory storage medium is also provided. The storage medium may store a computer program, on which at least one computer program is stored, the at least one computer program being executed by a processor to implement the following steps: screenshot information of a first terminal is acquired, and the screenshot information is converted into a bitmap corresponding to the screenshot information; a rotation state of a screen of the first terminal is acquired; when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap; and when it is determined that the screen does not rotate according to the rotation state, the bitmap is converted into the picture byte stream, and the picture byte stream is transmitted to the second terminal to synchronously display the screenshot information corresponding to the bitmap.

According to another embodiment of the present disclosure, an electronic device is also provided, which may include a processor and a memory. The memory is connected with the processor and configured to store at least one executable instruction of the processor, wherein the processor is arranged to execute the at least one executable instruction, and the at least one executable instruction comprises: screenshot information of a first terminal is acquired, and the screenshot information is converted into a bitmap corresponding to the screenshot information; a rotation state of a screen of the first terminal is acquired; when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap; and when it is determined that the screen does not rotate according to the rotation state, the bitmap is converted into the picture byte stream, and the picture byte stream is transmitted to the second terminal to synchronously display the screenshot information corresponding to the bitmap.

DETAILED DESCRIPTION OF THE EMBODIMENTS

The disclosure is described below with reference to the drawings and in conjunction with the embodiments in detail. It should be noted that in the case of no conflict, the features in the embodiments and the embodiments in the present application may be combined with each other.

However, during the use of the minicap, there is the following problem: during a screenshot process for a picture, when the screen rotates, a received screenshot has at least one black area, which makes the picture display incompletely.

Figure 1:
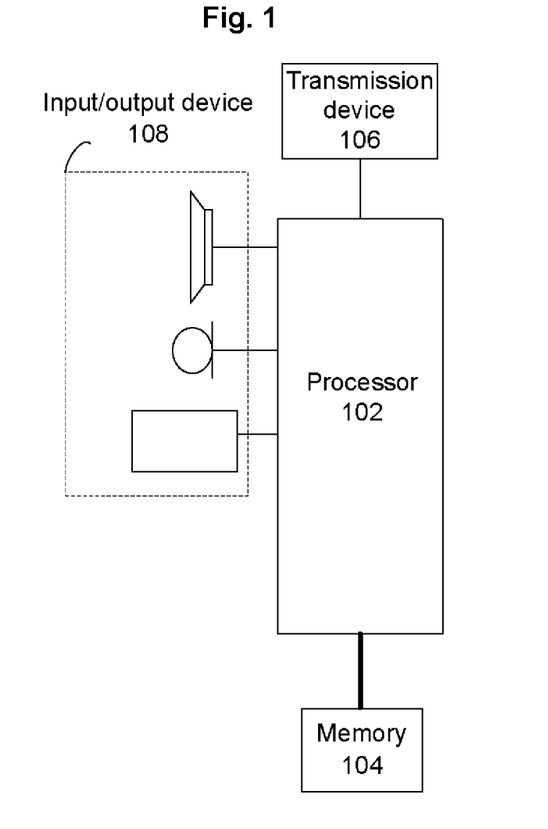
FIG. 1 is a block diagram of a hardware structure of a mobile terminal for a synchronous display method according to one embodiment of the present disclosure.

The method embodiment provided by one of the embodiments of the present disclosure may be implemented in a computer terminal or a similar computing device. Running on a mobile terminal is taken as an example, FIG. 1 is a block diagram of a hardware structure of a mobile terminal for a synchronous display method according to one embodiment of the present disclosure. As shown in FIG. 1, the mobile terminal may include at least one (only one is shown in FIG. 1) processor 102 (the processor 102 may include but is not limited to a processing apparatus such as a Micro Controller Unit (MCU) or a Field Programmable Gate Array (FPGA)) and a memory 104 for storing data. Optionally, the above mobile terminal may further include a transmission device 106 and an input/output device 108 for communication functions. Those skilled in the art can understand that the structure shown in FIG. 1 is merely illustrative, and does not limit the structure of the above mobile terminal. For example, the mobile terminal may also include more or fewer components than that shown in FIG. 1, or has a different configuration from that shown in FIG. 1.

The memory 104 may be configured to store a computer program, for example, a software program and at least one component of an application software, such as the computer program corresponding to the synchronous display method in the embodiment of the present disclosure, and the processor 102 executes various functional applications and data processing by running the computer program stored in the memory 104, that is, implements the above method. The memory 104 may include a high speed random access memory and may also include a non-transitory memory such as at least one magnetic storage device, a flash memory, or other non-transitory solid state memories. In some examples, the memory 104 may further include at least one memory remotely located relative to the processor 102, which may be connected to the mobile terminal via a network. The examples of such networks may include, but are not limited to, the Internet, the Intranet, local area networks, mobile communication networks, and combinations thereof.

The transmission device 106 is configured to receive or send data via a network. The above specific network example may include a wireless network provided by a communication provider of the mobile terminal. In one example, the transmission device 106 includes a Network Interface Controller (NIC) that may be connected to other network devices through a base station to communicate with the Internet. In one embodiment, the transmission device 106 may be a Radio Frequency (RF) module for communicating with the Internet wirelessly.

Figure 2:
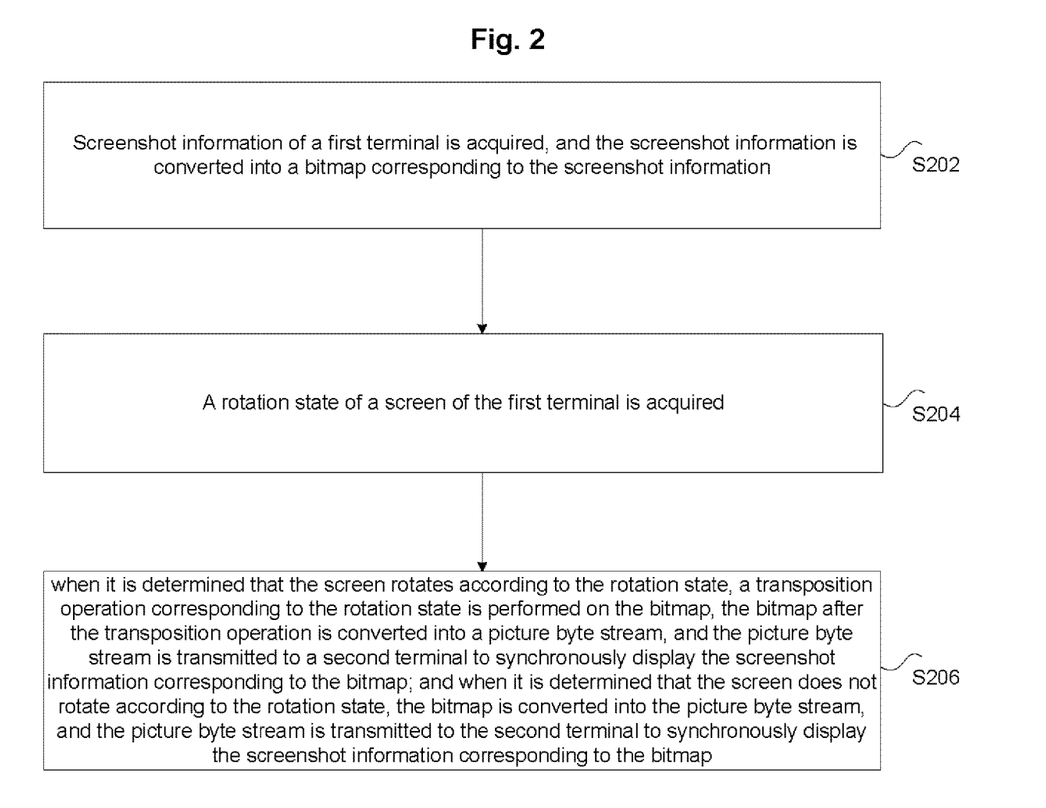
FIG. 2 is a flowchart of a synchronous display method according to one embodiment of the present disclosure.

In the present embodiment, a synchronous display method running on the mobile terminal is provided. FIG. 2 is a flowchart of a synchronous display method according to one embodiment of the present disclosure. As shown in FIG. 2, the flow includes the following steps.

At step S202, screenshot information of a first terminal is acquired, and the screenshot information is converted into a bitmap corresponding to the screenshot information.

At step S204, a rotation state of a screen of the first terminal is acquired.

At step S206, when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap; and when it is determined that the screen does not rotate according to the rotation state, the bitmap is converted into the picture byte stream, and the picture byte stream is transmitted to the second terminal to synchronously display the screenshot information corresponding to the bitmap.

Through step S202 to step S206, when it is determined that a screen rotates according to a rotation state, a transposition operation corresponding to the rotation state is performed on a bitmap converted from screenshot information, the bitmap after the transposition operation is converted into a picture byte stream, and the picture byte stream is transmitted to a second terminal to synchronously display the screenshot information corresponding to the bitmap. Therefore, a problem in the related art that in development and debugging process of at least one mobile terminal application, it is necessary to access and operate a remote terminal screen at a PC side, but the terminal screen rotates, a screenshot displayed synchronously is incomplete is solved, thereby the synchronous display effect of a remote real machine is achieved.

It should be noted that a execution subject of step S202 to step S206 may be a terminal or other devices. In addition, the first terminal may be a mobile terminal optionally, for example, a mobile phone, a tablet, or the like. The second terminal may be a computer terminal or another server device optionally.

In an optional implementation method of the present embodiment, when it is determined that the screen rotates involved in step S206, a transposition operation corresponding to the rotation state on the bitmap may be implemented by the following manners.

At step S206-11, a return value of a preset rotation function of a window management object is acquired, wherein the return value is used for indicating whether the screen rotates and a rotation angle of the screen.

At step S206-12, the transposition operation corresponding to the rotation state is performed on the bitmap according to the return value.

For step S206-11 and step S206-12, in a specific application scenario, the return value may indicate that the screen of the first terminal rotates by 90 degrees when the return value is equal to 1, may indicate that the screen of the first terminal rotates by 180 degrees when the return value is equal to 2, may indicate that the screen of the first terminal rotates by 270 degrees when the return value is equal to 3, and may indicate that the screen of the first terminal does not rotate when the return value is equal to 0. Therefore, when the return value is equal to 1, the rotation angle of the screen of the first terminal is 90 degrees, and therefore, a transposition operation of rotating by 90 degrees needs to be performed on the bitmap. Of course, specific values of the above return value and corresponding rotation angle are merely examples, and do not constitute a limitation on the present disclosure. In other implementation method, the return value and the corresponding rotation angle may also be set. For example, the return value is equal to 1, and the rotation angle of the screen of the first terminal is 270.

In another optional implementation method of the present embodiment, before the screenshot information of the first terminal is acquired at step S202, the method of the present embodiment may further include the following steps.

At step S102, the second terminal is triggered to start a first thread.

At step S104, a socket connection between the first terminal and the second terminal is established according to the first thread.

Based on step S102 and step S104, it can be known that after the socket connection between the first terminal and the second terminal is established according to the first thread, the first terminal may be determined as a socket server.

Based on the above socket connection, the bitmap after the transposition operation is converted into a picture byte stream, and the picture byte stream is transmitted to a second terminal to synchronously display the screenshot information corresponding to the bitmap involved in step S206 in the present embodiment may further include the following steps.

In step S206-13, the bitmap after the transposition operation is converted into a byte stream in a picture format, and the byte stream is encapsulated.

In step S206-14, the encapsulated byte stream is transmitted to the second terminal by the socket connection to synchronously display the screenshot information corresponding to the byte stream.

Based on step S206-13 and step S206-14, it can be known that the byte stream converted into the picture format may be transmitted to the second terminal via the socket connection to synchronously display the screenshot information corresponding to the byte stream.

In another optional implementation method of the present embodiment, the method of the present embodiment may further include the following step.

In step S106, before the screenshot information of the first terminal is acquired, the second terminal is triggered to start a second thread, wherein the second thread is used for restarting an operation of acquiring the screenshot information of the first terminal when the screenshot information of the first terminal is failed to be acquired fails.

It can be seen that the second thread can ensure that the operation of acquiring the screenshot information of the first terminal can be smoothly completed, and the synchronous display operation will not be terminated for the operation of acquiring the screenshot information fails.

The following describes the present disclosure in combination with specific implementation methods of the present embodiment.

A remote mobile phone screen is accessed and operated at a PC side may be used to solve inefficiency caused by frequent switching of a mobile phone and a screen of a PC due to the need to connect the mobile phone to the PC during the development and debugging process of at least one of Android phone application. Under the above circumstance, the screen of the mobile phone debugged may be displayed on the screen of the PC in real time through certain technical means.

During the development and debugging process of at least one Android phone applications, the related art often uses a minicap of a Github-based STF, and the mobile phone may be displayed in real time by using the minicap.

The basic principle of the minicap is: at the mobile phone side, a socket server is started by a minicap executable file to accept a connection from a PC client, the minicap continuously takes screenshots by an ndk interface, and screen frames are continuously sent to a socket client of the PC side. The PC side uses a command of adb forward to implement socket connection forwarding. The socket client of the PC forwards the connection to the minicap-opened socket server via the command of the adb forward, and reads a frame stream sent by the mobile phone continuously, so that the PC side may obtain sequential picture streams, which may be displayed through a Graphical User Interface (GUI) program or a Web page after the sequential picture streams is processed at the PC side.

However, during a screenshot process for a picture, when the screen rotates, a received screenshot has at least one black area, which makes the picture displayed incompletely. The minicap currently only supports, after testing, about 70% of the models in mtl, so that the compatibility is not ideal. And because screenshots are not obtained, system crashes often occur.

In order to solve the above problems, for example, the present embodiment uses the first terminal as an Android phone and the second terminal as a PC side, provides a same-screen display method that can be effectively used for optimizing a remote real machine in a way to improve compatibility and stability of screenshots by calling an Android underlying native java API, and solve a problem of screen-off by screen rotation by logic control.

First, the following points are described about the core idea of the present specific implementation method:

(1) In the present specific implementation method, by using a principle of Java underlying reflection, a method of screenshot ( ) of an Android underlying interface is called, and app_process of adb shell can be used for solving a call permission problem of a hidden interface SurfaceControl.screenshot ( )/Surface.screenshot ( ) method. A call return result of this method is a Bitmap, and the Bitmap is converted by corresponding byte stream, the mobile phone screenshot can be obtained smoothly.

(2) A getRotation method of IWindowManager is called to determine whether the current screen is rotated. A postRotate method of a Matrix class is called according to the rotated result, and the Bitmap can be turned accordingly, so as to achieve screenshot of picture rotation.

(3) An Android application is installed in a remote phone. The method that calls SurfaceControl.screenshot ( )/Surface.screenshot is implemented in the Android application. The mobile phone is connected to the PC via a connecting line, and the Android application is started through instruction (app_process) at the PC side, so that the mobile phone can be seen as a socket server.

(4) The PC side uses a command of an adb forward to implement socket connection forwarding. The socket client of the PC forwards the connection to the app_process-opened socket server by the command of the adb forward, so that the transmitted Android screen can be read in real time. After the PC side is processed, it can be displayed on the same screen in real time by a GUI program or a Web page.

Figure 3:
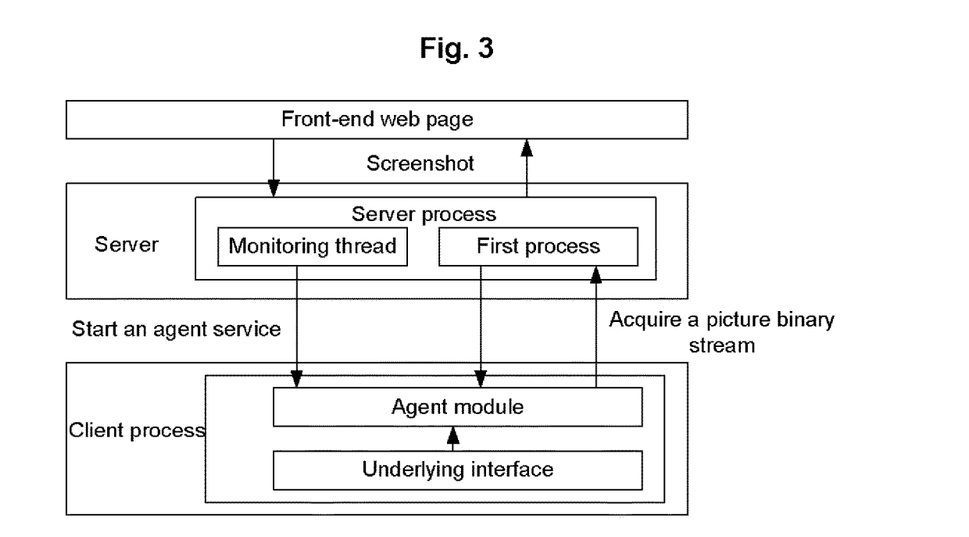
FIG. 3 is a system structure diagram of a real-time same-screen solution for a mobile device according to one embodiment of the present disclosure.

Based on the above (1) to (4), the present specific implementation method provides a system for a real-time same-screen solution for a mobile device. FIG. 3 is a system structure diagram of a real-time same-screen solution for a mobile device according to one embodiment of the present disclosure. As shown in FIG. 3, the system includes: a front-end web page, a server process (Yosemite process), and an agent module (Agent) of a client.

The front-end web page is used for establishing a socket connection (websocket) with a screenshot interface of a server, so as to continuously obtain screenshot pictures of a remote real machine and the screenshot pictures are displayed in the front-end web page.

The server-side Yosemite process includes two parts: a javacap thread (equivalent to the first thread) and a monitoring thread (equivalent to the second thread). The monitoring thread is used for starting an Agent module in a mobile phone client (App) and monitoring a status of the Agent module. When the Agent module hangs on the mobile phone, the Agent module will restart to ensure stable screenshot.

After the Agent module is started, the Yosemite process will start the javacap thread. The javacap thread establishes a socket connection with the Agent module. By establishing the socket connection, a binary stream of the real-time screenshot of the Agent module can be obtained, and can be obtained by the front-end page.

It should be noted that the Agent module runs on a remote real machine and is started and monitored by a monitor thread of the server Yosemite. The Agent module is connected to the javacap thread of Yosemite through the Socket connection, and the Agent module may communicate with the Yosemite through a protobuf protocol. After the agent module establishes the socket connection with the javacap thread, the agent module will continuously call an underlying interface (screenshot) to obtain a bitmap of the screenshot, convert the Bitmap into a binary stream of pictures in a jpg format, and then encapsulate the binary stream of pictures into a format specified by a protocol (protobuf) to be sent to the javacap thread for processing.

Figure 4:
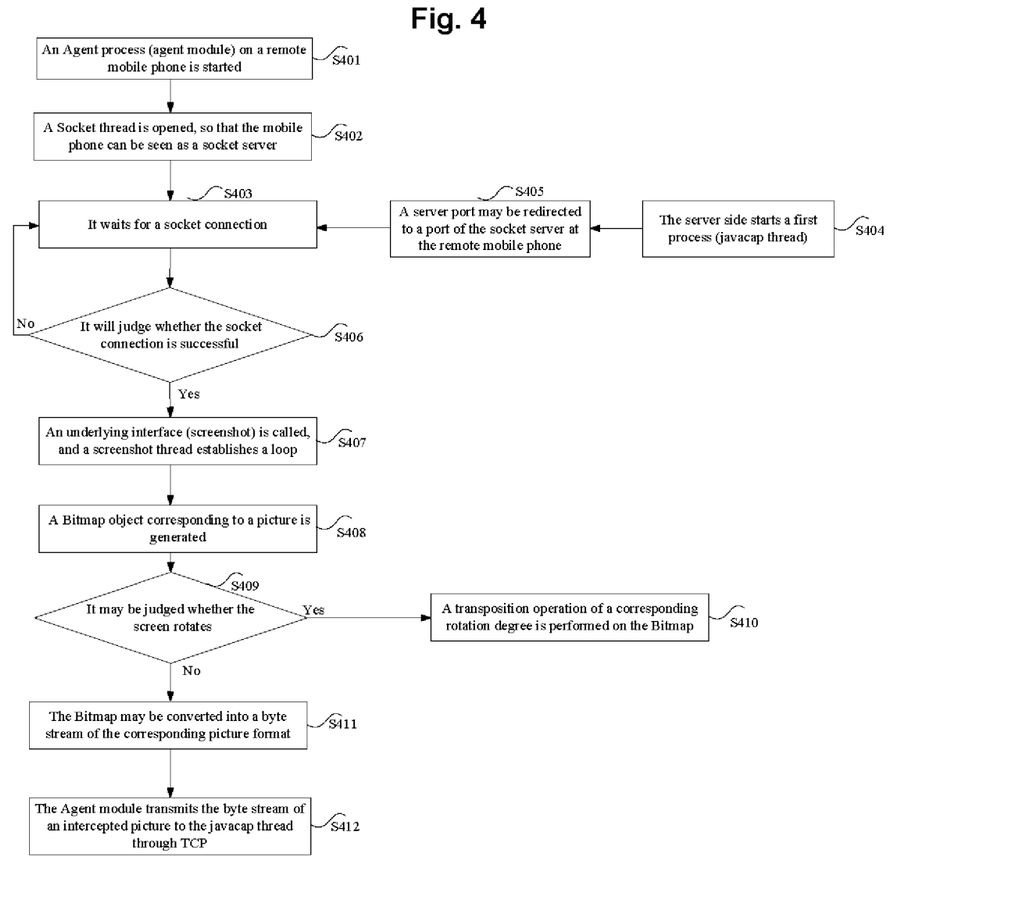
FIG. 4 is a method flowchart of performing a mobile device same-screen solution according to one embodiment of the present disclosure.

FIG. 4 is a method flowchart of performing a mobile device same-screen solution according to one embodiment of the present disclosure. As shown in FIG. 4, the method includes the following steps.

At step S401, an Agent process (agent module) on a remote mobile phone is started by an app_process command of adb.

At step S402, after the Agent process is started on the remote mobile phone, a Socket thread is opened, so that the mobile phone can be determined as a socket server.

At step S403, it waits for a socket connection, and the Socket thread continuously waits for a connection from a server side Yosemite.

At step S404, the server side starts a first process (javacap thread), which is used for establishing a socket connection with a remote device, and receives a screenshot byte stream of the remote device sent by the Agent module in a loop.

At step S405, by using a instruction of an adb forward, a server port may be redirected to a port of the socket server at the remote mobile phone, and a socket connection may be established.

At step S406, after the Socket thread waits for a connection from the server side Yosemite, it will judge whether the socket connection is successful. when it is determined that the socket connection is successful, step S407 is performed. when it is determined that the socket connection is unsuccessful, step S403 is performed.

At step S407, an underlying interface (screenshot) is called, and a screenshot thread establishes a loop.

In Android 4.2 and below, the thread will call the Surface.screenshot ( ) method, and in Android 4.2 and above, the SurfaceControl.screenshot ( ) method will be called.

At step S408, after the screenshot ( ) method is called, a Bitmap object corresponding to a picture is generated.

At step S409, it may be judged whether the screen rotates by a getRotation method of IWindowManager. when it is determined that the screen rotates, step S410 is performed, and when it is determined that the screen does not rotate, step S411 is performed. Optionally, a return value of a preset rotation function of a window management object is acquired. when the return value is equal to 1, the screen rotates by 90 degrees. when the return value is equal to 2, the screen rotates by 180 degrees. when the return value is equal to 3, the screen rotates by 270 degrees. when the return value is equal to 0, the screen does not rotate.

At step S410, when the screen rotates, a transposition operation of a corresponding rotation degree is performed on the Bitmap.

At step S411, when the screen does not rotate, a compress method of a Bitmap class is called, the Bitmap may be converted into a byte stream of the corresponding picture format, and byte streams of different formats and resolutions may be compressed by the compress method.

At step S412, after the Bitmap is converted into a byte stream, the Agent module transmits the byte stream of an intercepted picture to the javacap thread via TCP.

Through the above method steps of the present specific implementation method, the following beneficial effects can be brought.

Since Android system supports hidden interface SurfaceControl.screenshot ( )/Surface.screenshot ( ) at a underlying layer, and may use root to acquire an interface calling permission. Therefore the solution of the present specific implementation method may support most Android-based smart phones. The form of starting a service through an interface call can improve compatibility of a screenshot device. In addition, in the related art, by adopting a screenshot solution of the Android system, when the screen rotates, the screenshot often has a black screen and a black border. According to the present specific implementation method, a current rotation state of the screen is determined immediately after calling the screenshot interface to acquire a Bitmap. when the screen rotates, the Bitmap is immediately transposed accordingly to ensure that a picture can be displayed normally when the Bitmap is converted into the picture. Finally, the PC in the present specific implementation method monitors a running state of a client service process. when an abnormal exit occurs during the process of taking screenshots, the client process can be restarted to ensure subsequent data operations be smooth.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation method. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, a synchronous display apparatus is also provided. The apparatus includes at least one processors, and at least one memory for storing at least one program element, wherein the program element is executed by the at least one processor. The at least one program element may include a first acquisition component, a second acquisition component and a display component. The apparatus is configured to implement the above embodiments and preferred implementation methods, and the description thereof has been omitted. As used below, the term "component" may implement a combination of software and/or hardware of a predetermined function. Although the apparatus described in the following embodiments is preferably implemented by a software, a hardware or a combination of the software and the hardware is also possible and conceived.

Figure 5:
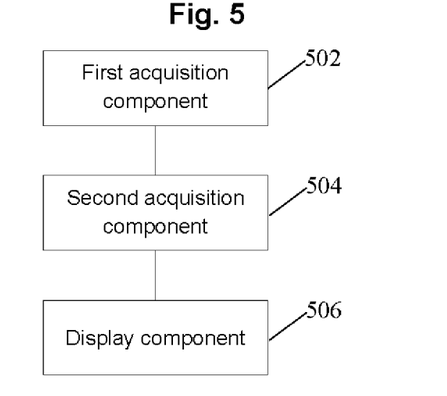
FIG. 5 is a schematic structure diagram of a synchronous display apparatus according to one embodiment of the present disclosure.

FIG. 5 is a schematic structure diagram of a synchronous display apparatus according to one embodiment of the present disclosure. As shown in FIG. 5, the apparatus includes: a first acquisition component 502, configured to acquire screenshot information of a first terminal, and convert the screenshot information into a bitmap corresponding to the screenshot information; a second acquisition component 504, coupled to the first acquisition component 502, and configured to acquire a rotation state of a screen of the first terminal; and a display component 506, coupled to the second acquisition component 504, and configured to: perform a transposition operation corresponding to the rotation state on the bitmap, convert the bitmap after the transposition operation into a picture byte stream, and transmit the picture byte stream to a second terminal to synchronously display the screenshot information corresponding to the bitmap, when it is determined that the screen rotates according to the rotation state; and convert the bitmap into the picture byte stream, and transmit the picture byte stream to the second terminal to synchronously display the screenshot information corresponding to the bitmap, when it is determined that the screen does not rotate according to the rotation state.

It should be noted that the first acquisition component 502, the second acquisition component 504 and the display component 506 may be run in a terminal as part of the device. The functions implemented by the above components may be executed by a processor in the terminal. The terminal may also be a smart phone (such as an Android phone or an iOS phone), a tablet, a palmtop, a Mobile Internet Device (MID), a PAD, or other terminal devices.

Optionally, the display component 506 involved in the present embodiment may further include: an acquisition element, configured to acquire a return value of a preset rotation function of a window management object, wherein the return value is used for indicating whether the screen rotates and a rotation angle of the screen; and a transposition element, configured to perform the transposition operation corresponding to the rotation state on the bitmap according to the return value.

It should be noted herein that the acquisition element and the transposition element may be run in the terminal as part of the device, and the functions implemented by the above elements may be executed by the processor in the terminal.

Figure 6:
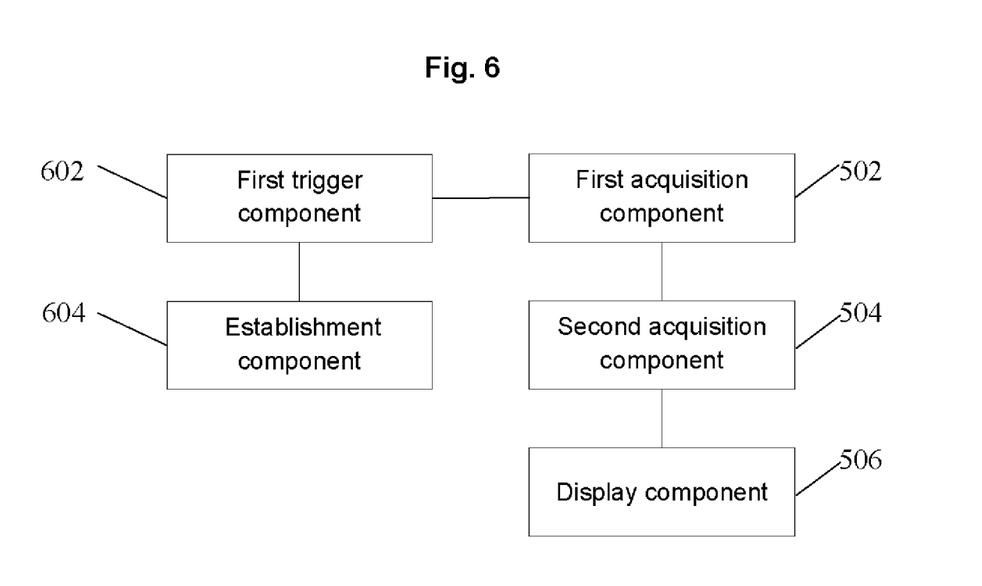
FIG. 6 is an optional schematic structure diagram 1 of a synchronous display apparatus according to one embodiment of the present disclosure.

FIG. 6 is an optional schematic structure diagram 1 of a synchronous display apparatus according to one embodiment of the present disclosure. As shown in FIG. 6, the apparatus may further include: a first trigger component 602, coupled to the first acquisition component 502, and configured to trigger the second terminal to start a first thread, before the screenshot information of the first terminal is acquired; and an establishment component 604, coupled to the first trigger component 602, and configured to establish a socket connection between the first terminal and the second terminal according to the first thread.

It should be noted herein that the first trigger component 602 and the establishment component 604 may be run in the terminal as part of the device, and the functions implemented by the above components may be executed by the processor in the terminal.

FIG. 6 is an optional schematic structure diagram 1 of a synchronous display apparatus according to one embodiment of the present disclosure.

Based on the components of the apparatus in FIG. 6, the display component 506 involved in the present embodiment may further include: a processing element, configured to convert the bitmap after the transposition operation into a byte stream in a picture format, and encapsulate the byte stream; and a display element, configured to transmit the encapsulated byte stream to the second terminal through the socket connection to synchronously display the screenshot information corresponding to the byte stream.

It should be noted herein that the processing element and the display element may be run in the terminal as part of the device, and the functions implemented by the above elements may be executed by the processor in the terminal.

Figure 7:
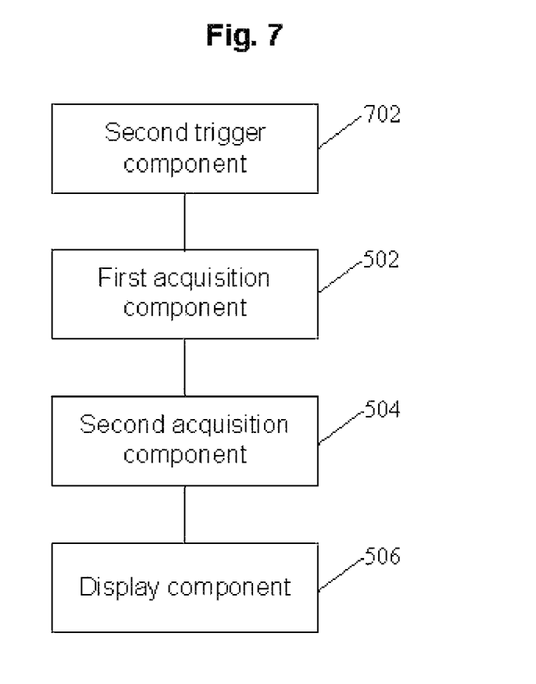
FIG. 7 is an optional schematic structure diagram 2 of a synchronous display apparatus according to one embodiment of the present disclosure.

FIG. 7 is an optional schematic structure diagram 2 of a synchronous display apparatus according to one embodiment of the present disclosure. As shown in FIG. 7, the apparatus further includes: a second trigger component 702, coupled to the first acquisition component 502, and configured to trigger the second terminal to start a second thread before the screenshot information of the first terminal is acquired, wherein the second thread is used for restarting an operation of acquiring the screenshot information of the first terminal when it is failed to acquired the screenshot information of the first terminal.

It should be noted herein that the second trigger component 702 may be run in the terminal as part of the device, and the functions implemented by the above components may be executed by the processor in the terminal.

It should be noted that each of the above components may be implemented by a software or a hardware. The latter may be implemented by, but not limited to, the following methods: the above components are all located in the same processor; or, the above components are located in different processors respectively in any combined form.

An embodiment of the present disclosure also provides a non-transitory storage medium. The non-transitory storage medium stores a computer program, where the computer program is configured to control a device where the non-transitory storage medium is located to perform the steps in any one of the above method embodiments during running.

Figure 8:
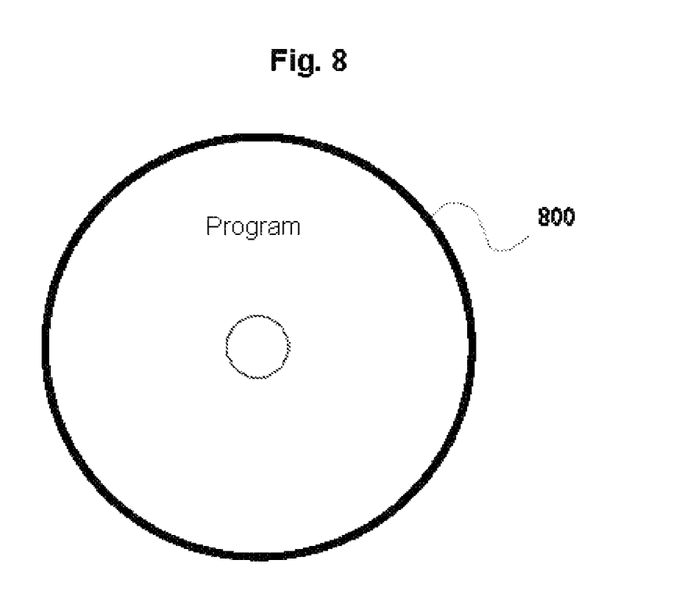
FIG. 8 is a schematic structure diagram of a storage medium according to an embodiment of the present disclosure.

FIG. 8 is a structural schematic diagram of a storage medium according to an embodiment of the present disclosure. As shown in FIG. 8, a program product 800 according to an implementation method of the present disclosure is described, on which at least one computer program is stored, the at least one computer program being executed by a processor to implement the following steps:

At S1, screenshot information of a first terminal is acquired, and the screenshot information is converted into a bitmap corresponding to the screenshot information.

At S2, a rotation state of a screen of the first terminal is acquired.

At S3, when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap; and when it is determined that the screen does not rotate according to the rotation state, the bitmap is converted into the picture byte stream, and the picture byte stream is transmitted to the second terminal to synchronously display the screenshot information corresponding to the bitmap.

Optionally, the computer program is executed by the processor to implement a program code for the following steps:

At S1, a return value of a preset rotation function of a window management object is acquired, wherein the return value is used for indicating whether the screen rotates and a rotation angle of the screen.

At S2, the transposition operation corresponding to the rotation state is performed on the bitmap according to the return value.

Optionally, the storage medium is further configured to store the computer program for performing the following steps.

At S1, before the screenshot information of the first terminal is acquired, the second terminal is triggered to start a first thread.

At S2, a socket connection between the first terminal and the second terminal is established according to the first thread.

Optionally, the computer program is executed by the processor to implement a program code for the following steps:

At S1, before the screenshot information of the first terminal is acquired, the second terminal is triggered to start a second thread, wherein the second thread is used for restarting an operation of acquiring the screenshot information of the first terminal when the screenshot information of the first terminal is failed to be acquired.

Through the above implementation methods, when it is determined that a screen rotates according to a rotation state, a transposition operation corresponding to the rotation state is performed on a bitmap converted from screenshot information, the bitmap after the transposition operation is converted into a picture byte stream, and the picture byte stream is transmitted to a second terminal to synchronously display the screenshot information corresponding to the bitmap. Therefore, the problem in the related art that in the development and debugging process of at least one mobile terminal application, it is necessary to access and operate a remote terminal screen at a PC side, but the terminal screen rotates, a screenshot displayed synchronously is incomplete is solved, thereby the synchronous display effect of a remote real machine is achieved.

The non-transitory storage medium may include data signal that is propagated in a baseband or as part of a carrier, carrying readable program code. Such propagated data signal may take a variety of forms including, but not limited to, electromagnetic signal, optical signal, or any suitable combination of the foregoing. The non-transitory storage medium may send, propagate, or transmit a program for using by or in connection with an instruction execution system, device or apparatus.

Program codes included in the non-transitory storage medium may be transmitted by any suitable medium, including but not limited to wireless, wire, optical cable, radio frequency, etc., or any suitable combination of the foregoing. Optionally, in the present embodiment, the non-transitory storage medium may include, but is not limited to, various media capable of storing a computer program such as a U disk, a Read-Only Memory (ROM), a Random Access Memory (RAM), a mobile hard disk, a magnetic disk or an optical disc.

An embodiment of the present disclosure also provides an electronic device, which includes a memory and a processor. The memory is connected with the processor and configured to store at least one executable instruction of the processor. The processor is configured to run the computer program to perform the steps in any one of the above method embodiments, which may be a mobile terminal as shown in FIG. 1.

Optionally, the electronic device may further include a transmission device and an input/output device, wherein the transmission device is connected to the processor, and the input/output device is connected to the processor.

Optionally, in the present embodiment, the processor may be configured to perform the following steps through the computer program.

At S1, screenshot information of a first terminal is acquired, and the screenshot information is converted into a bitmap corresponding to the screenshot information.

At S2, a rotation state of a screen of the first terminal is acquired.

At S3, when it is determined that the screen rotates according to the rotation state, a transposition operation corresponding to the rotation state is performed on the bitmap, the bitmap after the transposition operation is converted into a picture byte stream, and the picture byte stream is transmitted to a second terminal to synchronously display the screenshot information corresponding to the bitmap; and when it is determined that the screen does not rotate according to the rotation state, the bitmap is converted into the picture byte stream, and the picture byte stream is transmitted to the second terminal to synchronously display the screenshot information corresponding to the bitmap.

Optionally, the processor is further configured to store the computer program for performing the following steps.

At S1, a return value of a preset rotation function of a window management object is acquired, wherein the return value is used for indicating whether the screen rotates and a rotation angle of the screen.

At S2, the transposition operation corresponding to the rotation state is performed on the bitmap according to the return value.

Optionally, the processor is further configured to store the computer program for performing the following steps.

At S1, before the screenshot information of the first terminal is acquired, the second terminal is triggered to start a first thread.

At S2, a socket connection between the first terminal and the second terminal is established according to the first thread.

Optionally, the processor is further configured to store the computer program for performing the following steps.

At S1, before the screenshot information of the first terminal is acquired, the second terminal is triggered to start a second thread, wherein the second thread is used for restarting an operation of acquiring the screenshot information of the first terminal when the screenshot information of the first terminal is failed to be acquired.

Optionally, specific examples in the present embodiment may refer to the examples described in the above embodiments and optional implementation method, and details are not described herein in the present embodiment.

Through the above implementation methods, when it is determined that in the case where it is determined that a screen rotates according to a rotation state, a transposition operation corresponding to the rotation state is performed on a bitmap converted from screenshot information, the bitmap after the transposition operation is converted into a picture byte stream, and the picture byte stream is transmitted to a second terminal to synchronously display the screenshot information corresponding to the bitmap. Therefore, the problem in the related art that in the development and debugging process of at least one mobile terminal application, it is necessary to access and operate a remote terminal screen at a PC side, but the terminal screen rotates, a screenshot displayed synchronously is incomplete is solved, thereby the synchronous display effect of a remote real machine is achieved.

The processor may execute various function applications and data processing by running application programs and components stored in the memory. That is, the synchronous display method is implemented.

Obviously, the described embodiments are only a part of the embodiments of the present application, not all of the embodiments. All other embodiments obtained by those of ordinary skill in the art based on the embodiments of the present application without creative efforts should fall within the scope of protection of the present application.

It should be noted that the specification and claims of the present application and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present application described here can be implemented. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

Obviously, those skilled in the art should understand that the above-mentioned components or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

According to the present disclosure, when it is determined that a screen rotates according to a rotation state, a transposition operation corresponding to the rotation state is performed on a bitmap converted from screenshot information, the bitmap after the transposition operation is converted into a picture byte stream, and the picture byte stream is transmitted to a second terminal to synchronously display the screenshot information corresponding to the bitmap. Therefore, the problem in the related art that in the development and debugging process of at least one mobile terminal applications, it is necessary to access and operate a remote terminal screen at a PC side, but the terminal screen rotates, a screenshot displayed synchronously is incomplete is solved, thereby the synchronous display effect of a remote real machine is achieved.

What is claimed is:

1. A synchronous display method, comprising:
   acquiring screenshot information of a first terminal, and converting the screenshot information into a bitmap corresponding to the screenshot information;
   acquiring a rotation state of a screen of the first terminal;
   when it is determined that the screen rotates according to the rotation state, performing a transposition operation corresponding to the rotation state on the bitmap, converting the bitmap after the transposition operation into a picture byte stream, and transmitting the picture byte stream to a second terminal to synchronously display the screenshot information corresponding to the bitmap; and when it is determined that the screen does not rotate according to the rotation state, converting the bitmap into the picture byte stream, and transmitting the picture byte stream to the second terminal to synchronously display the screenshot information corresponding to the bitmap;
   wherein converting the bitmap after the transposition operation into a picture byte stream, and transmitting the picture byte stream to a second terminal to synchronously display the screenshot information corresponding to the bitmap comprises:
   converting the bitmap after the transposition operation into a byte stream in a picture format, and encapsulating the byte stream; and
   transmitting the encapsulated byte stream to the second terminal to synchronously display the screenshot information corresponding to the byte stream.

2. The method as claimed in claim 1, wherein when it is determined that the screen rotates, performing the transposition operation corresponding to the rotation state on the bitmap comprises:
   acquiring a return value of a preset rotation function of a window management object, wherein the return value is used for indicating whether the screen rotates and, a rotation angle of the screen; and
   performing the transposition operation corresponding to the rotation state on the bitmap according to the return value.

3. The method as claimed in claim 1, wherein before acquiring screenshot information of the first terminal, the method further comprises:
   triggering the second terminal to start a first thread; and
   establishing a socket connection between the first terminal and the second terminal according to the first thread.

4. The method as claimed in claim 3, wherein transmitting the encapsulated byte stream to the second terminal to synchronously display the screenshot information corresponding to the byte stream comprises:
   transmitting the encapsulated byte stream to the second terminal by the socket connection to synchronously display the screenshot information corresponding to the byte stream.

5. The method as claimed in claim 1, wherein before acquiring the screenshot information of the first terminal, the method further comprises:
   triggering the second terminal to start a second thread, wherein the second thread is used for restarting an operation of acquiring the screenshot information of the first terminal when the screenshot information of the first terminal is failed to be acquired.

6. A non-transitory storage medium applied to a synchronous display method, storing a computer program, on which at least one computer program is stored, the at least one computer program being executed by a processor to implement the following steps:
   acquiring screenshot information of a first terminal, and converting the screenshot information into a bitmap corresponding to the screenshot information;
   acquiring a rotation state of a screen of the first terminal;
   when it is determined that the screen rotates according to the rotation state, performing a transposition operation corresponding to the rotation state on the bitmap, converting the bitmap after the transposition operation into a picture byte stream, and transmitting the picture byte stream to a second terminal to synchronously display the screenshot information corresponding to the bitmap; and when it is determined that the screen does not rotate according to the rotation state, converting the bitmap into the picture byte stream, and transmitting the picture byte stream to the second terminal to synchronously display the screenshot information corresponding to the bitmap;
   wherein converting the bitmap after the transposition operation into a picture byte stream, and transmitting the picture byte stream to a second terminal to synchronously display the screenshot information corresponding to the bitmap comprises:
   converting the bitmap after the transposition operation into a byte stream in a picture format, and encapsulating the byte stream; and
   transmitting the encapsulated byte stream to the second terminal to synchronously display the screenshot information corresponding to the byte stream.

7. An electronic device executing a synchronous display method, comprising:
   a processor; and
   a memory, connected with the processor and configured to store at least one executable instruction of the processor,
   wherein the processor is arranged to execute the at least one executable instruction, and the at least one executable instruction comprises:
   acquiring screenshot information of a first terminal, and converting the screenshot information into a bitmap corresponding to the screenshot information;
   acquiring a rotation state of a screen of the first terminal;
   when it is determined that the screen rotates according to the rotation state, performing a transposition operation corresponding to the rotation state on the bitmap, converting the bitmap after the transposition operation into a picture byte stream, and transmitting the picture byte stream to a second terminal to synchronously display the screenshot information corresponding to the bitmap; and when it is determined that the screen does not rotate according to the rotation state, converting the bitmap into the picture byte stream, and transmitting the picture byte stream to the second terminal to synchronously display the screenshot information corresponding to the bitmap;
   wherein converting the bitmap after the transposition operation into a picture byte stream, and transmitting the picture byte stream to a second terminal to synchronously display the screenshot information corresponding to the bitmap comprises:
   converting the bitmap after the transposition operation into a byte stream in a picture format, and encapsulating the byte stream; and
   transmitting the encapsulated byte stream to the second terminal to synchronously display the screenshot information corresponding to the byte stream.

8. The method as claimed in claim 1, wherein acquiring the rotation state of the screen of the first terminal comprising:
   calling a getRotation method of IWindowManager to determine whether the screen is rotated.

9. The method as claimed in claim 1, wherein converting the bitmap into a picture byte stream comprising:
   calling a compress method of a Bitmap class, to convert the bitmap into the picture byte stream.

10. The method as claimed in claim 2, wherein before acquiring the return value of the preset rotation function of a window management object, the method further comprising:
    setting correspondence between the return value and the rotation angle.

11. The method as claimed in claim 3, wherein after establishing the socket connection between the first terminal and the second terminal according to the first thread, the method further comprising:
    determining the first terminal as a socket server.

12. The method as claimed in claim 3, wherein establishing a socket connection between the first terminal and the second terminal according to the first thread comprising:
    after starting an agent module in the first terminal by a second thread, starting the first thread, and establishing the socket connection between the first thread and the agent module.

13. The method as claimed in claim 12, wherein the agent module is used for calling an underlying interface to obtain the bitmap.

14. The method as claimed in claim 12, wherein the first thread is a javacap thread, the second thread is a monitoring thread.

15. The method as claimed in claim 12, wherein the agent module is used for transmitting the byte stream to the first thread via TCP.

16. The method as claimed in claim 4, wherein encapsulating the byte stream comprising:
    encapsulating the byte stream into a format specified by a protocol, wherein the first thread is used for processing the byte stream encapsulated.

17. The non-transitory storage medium as claimed in claim 6, the at least one executable instruction further comprises:
    acquiring a return value of a preset rotation function of a window management object, wherein the return value is used for indicating whether the screen rotates and, a rotation angle of the screen; and
    performing the transposition operation corresponding to the rotation state on the bitmap according to the return value.

18. The non-transitory storage medium as claimed in claim 6, the at least one executable instruction further comprises:
    triggering the second terminal to start a first thread; and
    establishing a socket connection between the first terminal and the second terminal according to the first thread.

19. The non-transitory storage medium as claimed in claim 6, the at least one executable instruction further comprises:
    converting the bitmap after the transposition operation into a byte stream in a picture format, and encapsulating the byte stream; and
    transmitting the encapsulated byte stream to the second terminal by the socket connection to synchronously display the screenshot information corresponding to the byte stream.

20. The non-transitory storage medium as claimed in claim 6, the at least one executable instruction further comprises:
    triggering the second terminal to start a second thread, wherein the second thread is used for restarting an operation of acquiring the screenshot information of the first terminal when the screenshot information of the first terminal is failed to be acquired.

\* \* \* \* \*